United States Patent [19]
Parker

[11] Patent Number: 5,632,234
[45] Date of Patent: May 27, 1997

[54] TWO-PET LEASH

[76] Inventor: Gerald C. Parker, 4915 Edinborough Rd., Greensboro, N.C. 27406

[21] Appl. No.: 515,687

[22] Filed: Aug. 16, 1995

[51] Int. Cl.$^6$ ............................................. A01K 27/00
[52] U.S. Cl. ............................................. 119/795
[58] Field of Search .................... 119/769, 795, 119/792, 793, 796, 797, 798; 294/82.12

[56] References Cited

U.S. PATENT DOCUMENTS

| | | | |
|---|---|---|---|
| D. 244,869 | 6/1977 | Manley et al. | D30/39 |
| D. 337,396 | 7/1993 | Werner | D30/153 |
| 502,954 | 8/1893 | Crepeau | 119/769 |
| 2,776,644 | 1/1957 | Fontaine | 119/796 |
| 3,172,394 | 3/1965 | Taylor | 119/769 X |
| 3,709,548 | 1/1973 | Hogshead | 294/84.12 |
| 4,139,179 | 2/1979 | Kukulski | 294/84.12 |
| 4,879,972 | 11/1989 | Crowe et al. | 119/792 |
| 4,892,063 | 1/1990 | Garrigan | 119/109 |

*Primary Examiner*—Thomas Price
*Attorney, Agent, or Firm*—Rhodes, Coats & Bennett, LLP.

[57] ABSTRACT

A two-pet leash that permits two pets, such as dogs, to be walked simultaneously. The two-pet leash of the invention resists tangling and is continuously adjustable. The two-pet leash includes three main components: a handle, a pulley attached to the handle by a swivel, and an elongated, flexible pet lead running through the pulley. In turn, the pet lead includes a first end section for attachment to a first pet, a second end section for attachment to a second pet, and a middle section that runs through the pulley. Stops between each end section and the middle section prevent the end sections from being pulled through the pulley. In the preferred embodiment, the pet lead is formed from a single, elongated length of material. In a second embodiment, the pet lead is formed from distinct, separate lengths of material so that the leash can be converted into two separate single-pet leashes.

15 Claims, 3 Drawing Sheets

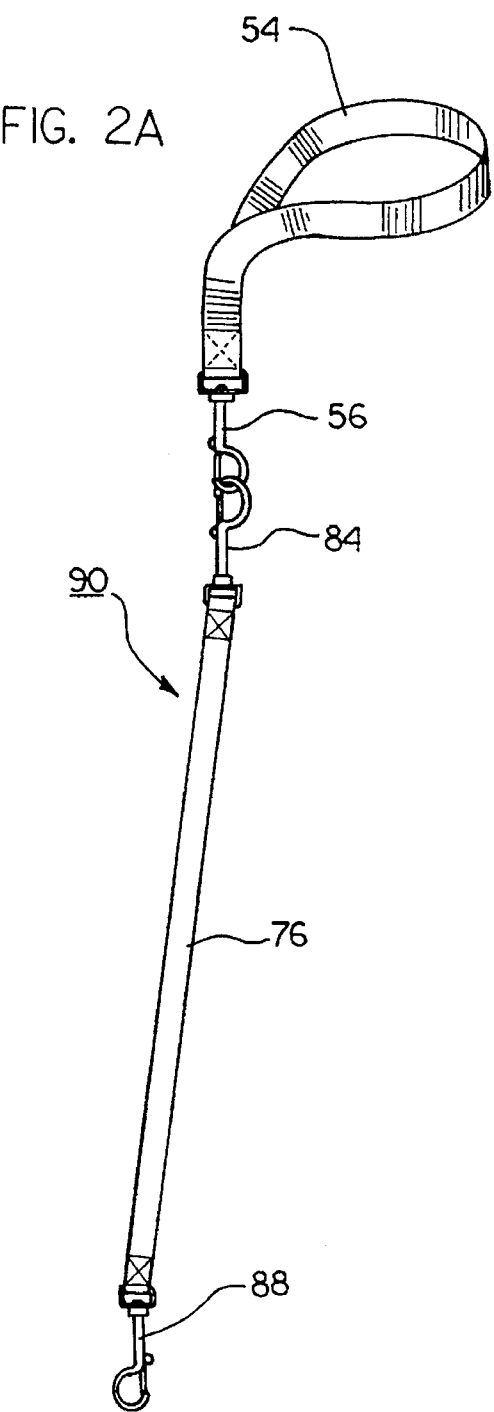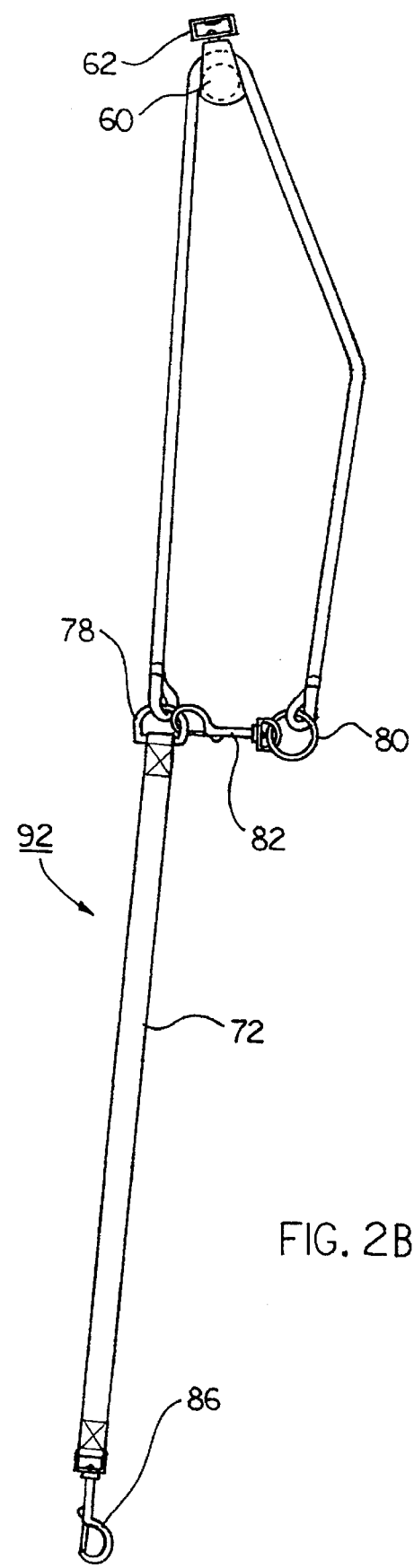

TWO-PET LEASH

FIELD OF THE INVENTION

The present invention relates generally to a pet leash and, more particularly, to a two-pet leash for walking two pets, such as dogs, simultaneously.

BACKGROUND OF THE INVENTION

Many pet owners who have more than one pet, such as dogs, enjoy walking two pets simultaneously. However, by using two conventional single-pet leashes separately, one for each pet, several problems are often encountered. A first problem with separate leashes is that they tend to get tangled with each other when, for example, the pets play with each other or their owner or when they cross back and forth across each other's paths when being walked.

Another problem with walking two pets on separate leashes is that when the pets try to go in different directions, they are often difficult to control. This is because, first, two pets have a relatively large area in which to roam when each is attached to a separate leash, which leads to control difficulties in close quarters. Second, two pets pulling in different directions on two leashes can often overcome the strength of the owner, at least tiring the owner quickly, or in some cases even injuring the owner.

Previous attempts to address the above problems have resulted in the invention of several leashes that are designed to restrain two or more pets. U.S. Pat. No. Design 244,869 to Manley et al. shows a Y-shaped animal leash having two leads to which pets may be attached. U.S. Pat. No. 4,879,972 to Crowe et al. discloses a double pet walker that includes three flexible straps. Each strap has a hand loop on one end and a swivel snap fastener on the other end. The straps are assembled so as to provide a double pet walker by attaching the swivel snap fastener of one strap to the two hand loops of the remaining straps. This results in a generally Y-shaped pet walker with a hand loop on one end and two swivel snap fasteners on the other two ends, which act as leads for attachment to two pets. Alternately, the Crowe device can be used as two or three separate leashes; however, for use as two separate leashes, the resulting leashes are either both relatively short or are of unequal length. U.S. Pat. No. 4,892,063 to Garrigan discloses a leash for two or more animals that includes one or more leads having snap fasteners on opposite ends. The leads are held together in the middle by a sleeve-type handle.

While all of these leashes solve the problem of allowing more than one pet to be walked at a time, they still leave room for improvement in other respects. The Manley and Garrigan devices appear to be as easily tangled as separate leashes, if not more so. By including a swivel snap fastener at the "Y" joinder among the three straps, the Crowe device helps alleviate the tangling problems that come with using two separate leashes. However, none of these multi-pet leashes solve the problems with controlling pets that each want to roam in opposite directions as far as their individual leads will allow, because none of these devices allow adjustment of the leads' lengths as the pets are being walked. Likewise, there is no provision for pets of unequal size or energy, where a stronger or more active pet needs more room to run than a smaller or more docile pet.

Thus, there remains a need for a new and improved two-pet leash that permits two pets to be walked simultaneously without tangling of the leash, while at the same time being automatically and continuously adjustable to allow for differences in activity between the two pets connected to the leash.

SUMMARY OF THE INVENTION

The present invention is directed to a two-pet leash that permits two pets, such as dogs, to be walked simultaneously without the tangling problems inherent with the use of two separate leashes. The two-pet leash of the invention is continuously adjustable so that a more active of the two pets will have a greater length of lead to run with, while a less energetic pet will be kept closer to the pets' handler. In an alternate embodiment, the two-pet leash of the invention is convertible into two separate single-pet leashes.

Both embodiments of the two-pet leash generally include three main components: a handle, a pulley attached to the handle by a swivel, and an elongated, flexible pet lead. In turn, the pet lead includes a first end section for attachment to a first pet, a second end section for attachment to a second pet, and a middle section between the end sections, which is threaded through the pulley and is movable back and forth through the pulley. Both end sections preferably include pet collar connectors, such as swivel snap fasteners, attached to terminal ends of the end sections. Both embodiments of the two-pet leash also include limiting structures or stops between each of the two end sections and the middle section of the pet lead, which prevent the end sections from passing through the pulley.

In the preferred embodiment of the two-pet leash, the pet lead is formed from a single, elongated length of material, such as rope or strapping. The lead is tied into knots at two points, which serve both to demarcate the middle section from the end sections and to function as the stops. Preferably, this embodiment also includes an optional clamping mechanism that connects the stops together and substantially prevents the middle section of the pet lead from moving back and forth through the pulley.

In the alternate embodiment of the two-pet leash, which is convertible into two separate single-pet leashes, the pet lead is formed from three distinct lengths of material. The first end section, which is formed from the first length of material, is permanently attached with a connector to the middle section, which is formed from the second length of material. The second end section, which is formed from the other length of material, is detachably connected to the middle section. In this embodiment of the two-pet leash, the handle is detachably connected to the pulley, and a conversion fastener is provided at the end of the middle section opposite the first end section. The two-pet leash is convertible into a first single-pet leash by detaching the second end section from the middle section, detaching the handle from the pulley, and then attaching the handle to the second end section. The second single-pet leash is created by connecting the conversion fastener to the connector between the first end section and the middle section.

Accordingly, one object of the present invention is to provide a two-pet leash that allows two pets to be walked simultaneously without tangling of the leash.

A further object of the present invention is to provide a two-pet leash that continuously and automatically self-adjusts to accommodate pets of different energy or strength levels.

Another object of the present invention is to provide a two-pet leash having two leads and a clamping structure for connecting the two leads together to thereby keep pets at the ends of the leads in close proximity to each other.

A further object of the present invention is to provide a two-pet leash that can be converted into two separate single-pet leashes.

3

These and other objects of the present invention will become apparent to those skilled in the art after a reading of the following description of the preferred embodiments when considered with the drawings.

BRIEF DESCRIPTION OF THE DRAWINGS

FIG. 2A shows the first separate, single-pet leash created from the leash of FIG. 2.

FIG. 2B shows the second separate, single-pet leash created from the leash of FIG. 2.

DESCRIPTION OF THE PREFERRED EMBODIMENTS

Figure 1:
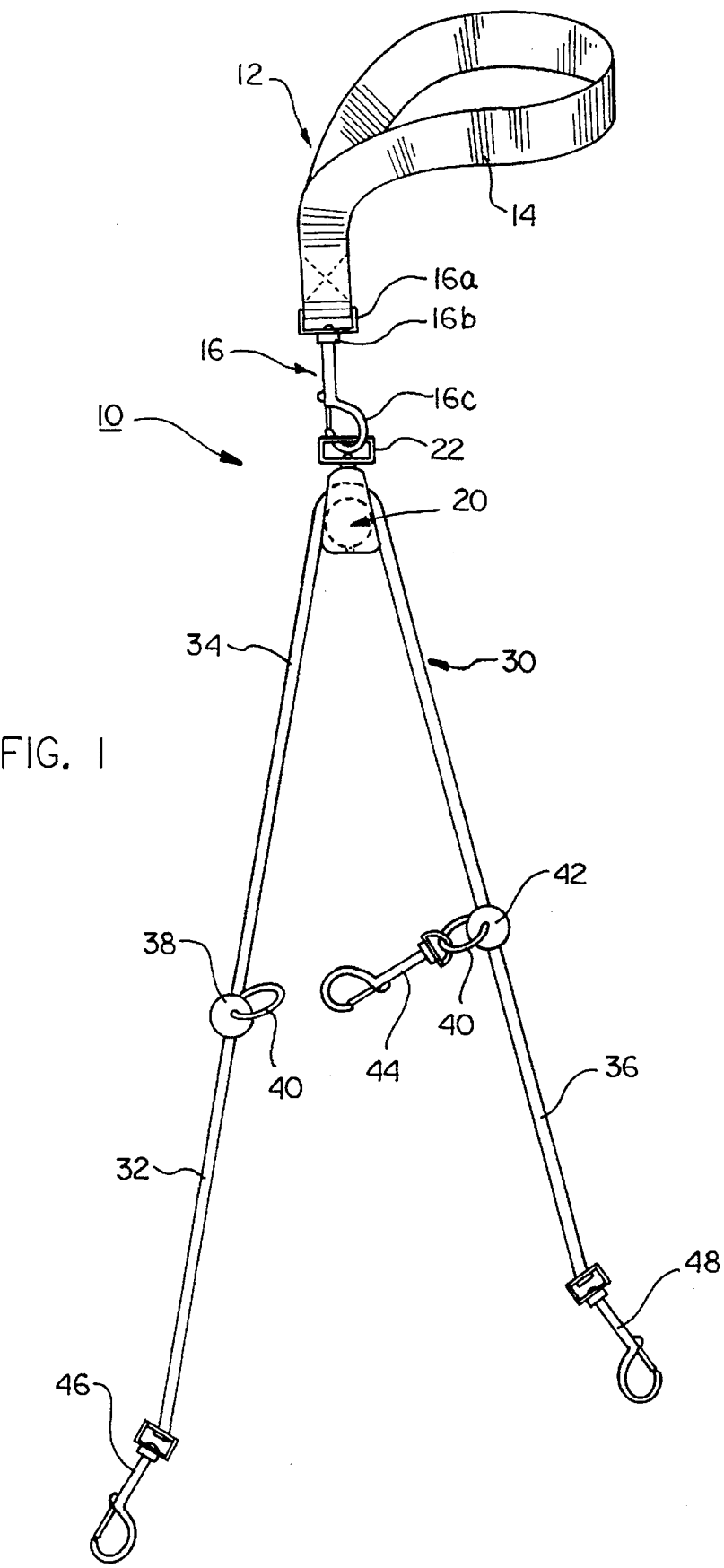
FIG. 1 is a depiction of the preferred embodiment of the two-pet leash of the invention.

Referring now to the drawings in general, it will be understood that the illustrations are for the purpose of describing preferred embodiments of the invention and are not intended to limit the invention thereto. The present invention is directed to a two-pet leash, indicated generally by the numeral 10 in FIG. 1, which may be used to walk two pets simultaneously. In an alternate embodiment of the invention, indicated generally by the numeral 50 in FIG. 2, the two-pet leash can be converted into two separate, single-pet leashes of approximately equal length, which are indicated generally by the numerals 90 and 92 and shown, respectively, in FIGS. 2A and 2B. Either embodiment of the two-pet leash of the invention can be used with any pets wearing collars, such as dogs, cats, or other animals, or can even be used to restrain young children wearing harnesses.

Turning now to FIG. 1, this drawing shows a preferred embodiment of the two-pet leash 10 generally having three subcomponents: a handle 12, a pulley 20 connected to the handle 12, and an elongated, flexible pet lead 30 running through the pulley 20. The handle 12 is preferably made of flexible strapping material formed into a loop strap 14 sized to receive a person's hand. For example, in the embodiment shown, the loop strap 14 is made of approximately ½" nylon strapping material sewn into approximately a 12" long loop. Depending from the sewn end of the loop strap 14 is a swivel snap fastener 16, which generally includes three parts: an attachment end 16a sewn into the loop strap 14, a swivel bolt 16b, and a spring loaded snap closure end 16c. While the two-pet leash 10 (and the alternate embodiment 50 to be described later) include other swivel snap fasteners, they will not be described in detail, because each is preferably similar or identical to the swivel snap 16 of the handle 12 described above.

Attached to the handle 12 by the swivel snap 16 is a pulley 20. The pulley 20 is preferably a conventional pulley having a rotating wheel with a concave outer periphery, which rotates inside a housing. In the preferred embodiment, the pulley 20 is large enough to accommodate the pet lead 30, yet not so large as to be heavy and unwieldy. The pulley 20 preferably includes a swiveling attachment member 22 mounted atop its housing for attachment to the swivel snap 16. These swiveling structures help prevent the two-pet leash 10 of the invention from becoming tangled should the two pets behave rambunctiously.

The pet lead 30 is preferably made of an elongated, flexible line of material, such as rope or strapping material, which is strong enough to restrain strong animals. In the embodiment disclosed, the pet lead 30 is formed from approximately 6 feet of ¼" nylon rope, although approximately ½" nylon strapping could also be used. Of course, the length and thickness of the lead 30 is a matter of choice and could vary depending on the nature of the pets being walked. The pet lead 30 generally includes three subcomponents: a first end section 32 for attachment to a first pet, a second end section 36 for attachment to a second pet, and a middle section 34 between the first and second end sections 32, 36. Each of the end sections 32, 36 preferably terminates at a pet collar connector for attaching the ends of the end sections 32, 36 to collars or harnesses on the pets. In the preferred embodiment, the pet collar connectors include first and second swivel snap fasteners 46 and 48, which are attached, respectively, to the first and second end sections 32 and 36 of the pet lead 30.

The middle section 34 of the pet lead 30 is threaded through the pulley 20 and runs back and forth through the pulley 20 on its rotating wheel. To restrict the movement of the lead line 30 through the pulley 20 and prevent the end sections 32, 36 from passing through the pulley 20, a first limiting structure or stop 38 is provided between the first end section 32 and the middle section 34, and a second limiting structure or stop 42 is provided between the second end section 36 and the middle section 34. The stops 38, 42 are sized too large to pass through the pulley 20 so that only the middle section 34 of the lead 30 can move back and forth through the pulley 20. In the preferred embodiment, the stops 38, 42 each comprise a knot in the lead line 30, spaced a distance from the terminal ends of the end sections 32, 36. For example, in the embodiment shown, the stops are approximately 18" from the ends of the end sections 32, 36.

During use of the two-pet leash 10 to walk two pets, the pet with more energy will pull ahead and use up all of the middle section 34 of the lead 30. Therefore, the stronger or more active pet can make use of a longer lead than the smaller or less active pet. The stops 38, 42 prevent the stronger pet from using up the entire lead 30, however. The distance that the stops 38, 42 are spaced from the terminal ends of the end sections 32, 36 therefore depends on the minimum lead length desired for the less active of the two pets.

One distinct advantage that the two-pet leash 10 of the invention enjoys over previously designed multiple pet leashes is this adjustability of the lead length by the provision of the pulley 20. Because the slack in the pet lead 30 is almost always taken up by one or both pets, there is less potential for a portion of the lead to be dragged on the ground or become tangled. With the design of the present invention, the entire lead, including the sections on both sides of the pulley 20, are taught at all times. In addition, the pets have more freedom of movement depending on which pet feels more active at any given moment. Another advantage of the two-pet leash 10 of the present invention is that if the two pets choose to roam in different directions, the stress of this force is partially transferred from one pet to the other, and not to the person handling the pets. In other words, the pets tend to pull against each other, making walking them less tiresome.

To prevent two pets from roaming over a wide area when it is desirable to keep the pets close together, the pet lead 30 may optionally be provided with a clamping mechanism, which connects the first and second stops 38, 42 together. The clamping mechanism substantially prevents the middle section 34 from being pulled through the pulley 20 and restricts the movement of the pets by fixing the length of the lead running to each pet. This can also be used for training purposes, such as for teaching two pets to walk side-by-side in tandem. In the preferred embodiment, the clamping mechanism includes rings 40 attached to each stop 38, 42 and a swivel snap 44 attached to one of the rings 40. In the embodiment shown in FIG. 1, the lead rope 30 is knotted around the rings 40 to create the first and second stops 38, 42. The swivel snap 44 is permanently mounted to one of the rings 40 and can be snapped around the other ring 40 to hold the two sides of the lead 30 together.

Figure 2:
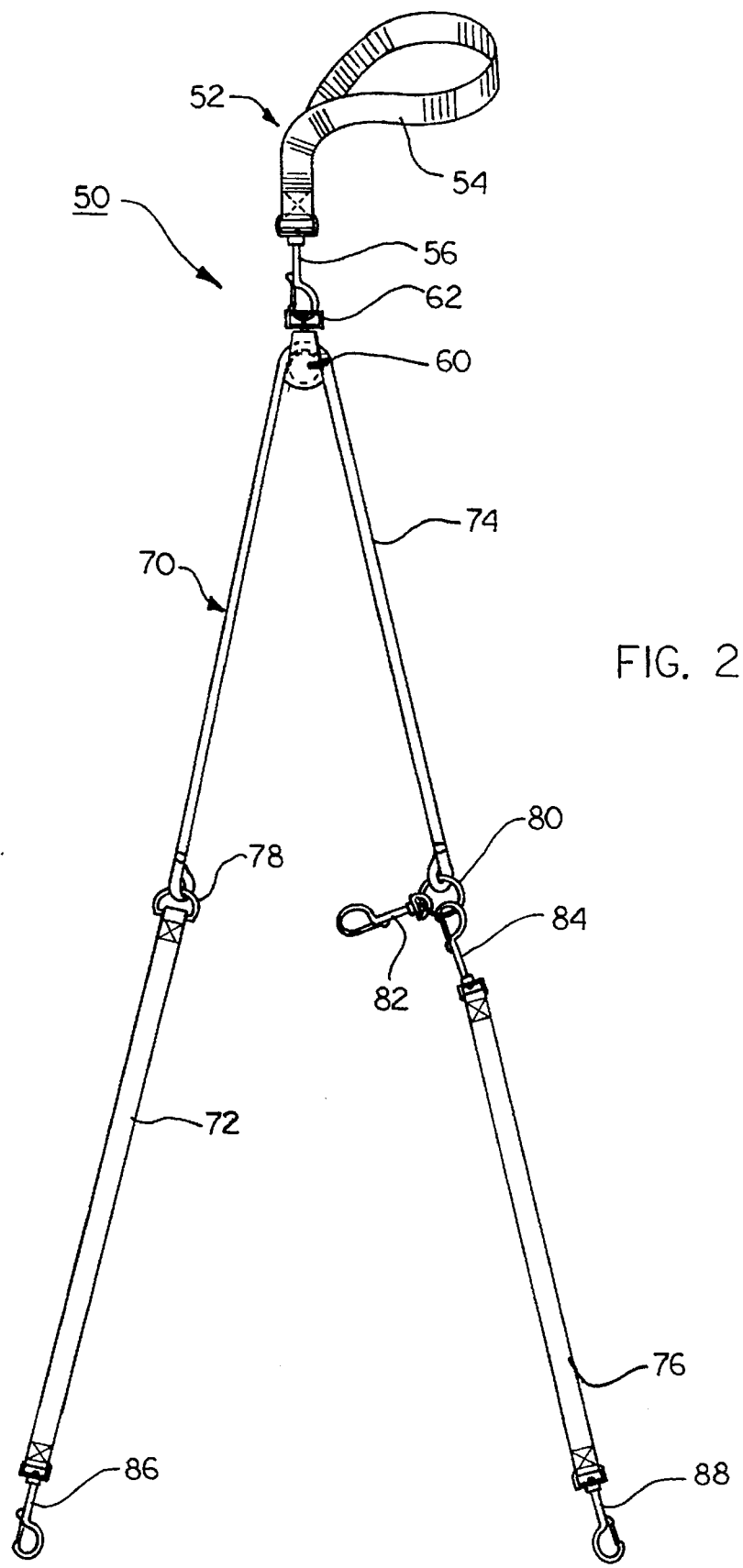
FIG. 2 is a depiction of an alternate embodiment of the two-pet leash of the invention, which is convertible into two separate, single-pet leashes.

Turning now to FIG. 2, this drawing illustrates the alternate embodiment 50 of the two-pet leash of the invention that can be converted into two separate single-pet leashes. This convertible two-pet leash 50 also generally includes three subcomponents: a handle 52, a pulley 60 connected to the handle 52, and an elongated, flexible pet lead 70 running through the pulley 60. Like the handle 12 in the embodiment of the two-pet leash 10 described above, the handle 52 is preferably made of flexible strapping material formed into a loop strap 54, which is sized to receive a person's hand. For example, in the embodiment shown in FIG. 2, the loop strap 54 is made of approximately ½" nylon strapping material sewn into approximately a 12" long loop. Depending from the sewn end of the loop strap 54 is a swivel snap fastener 56 for detachably connecting the handle 52 to a pulley 60 having a swivel member 62.

Like the pet lead 30 in the first embodiment described, the pet lead 70 of the convertible two-pet leash includes three general subcomponents: a first end section 72 for attachment to a first pet, a second end section 76 for attachment to a second pet, and a middle section 74 between the first and second end sections 72, 76, which runs back and forth through the pulley 60. Each of the end sections 72, 76 preferably terminates in a pet collar connector, such as first and second swivel snap fasteners 86 and 88, respectively.

Unlike the lead 30 of the two-pet leash 10 shown in FIG. 1, which is essentially formed from a single length of material, the three sections of the lead 70 of the convertible two-pet leash 50 are formed from three distinct lengths of material. Each section of the lead 70 is preferably made of an elongated, flexible line of material, such as rope or strapping material, which is strong enough to restrain strong animals. In the embodiment disclosed, the middle section 74 is formed from approximately ¼" nylon rope, and the first and second end sections 72, 76 are each formed from approximately ½" nylon strapping. However, all three sections 72, 74, 76 could be formed from the same material and the lengths could be varied as required.

In the preferred embodiment of the convertible two-pet leash 50, the first end section 72 is connected to the middle section 74 by a first connector ring 78 between the first end section 72 and the middle section 74. Preferably, these two sections 72, 74 of the lead 70 are permanently attached to the first ring 78. In addition to connecting these two sections together, the first ring 78 also serves as the first stop to prevent the first end section 72 from being pulled through the pulley 60.

The second end section 76 is also connected to the middle section 74 by a connector ring 80, which is preferably permanently attached to the middle section 74. However, the second end section 76 is attached to this second ring 80 by a swivel snap 84 mounted on the second end section 76. Therefore, the second end section 76 may be detached from the middle section 74 by disconnecting the swivel snap 84 from the ring 80. In addition to providing an attachment between the second end section 76 and the middle section 74, the second connector ring 80 serves as the second stop to prevent the second end section 76 of the pet lead 70 from being pulled through the pulley 60.

The convertible two-pet leash 50 also includes a clamping mechanism to prevent two pets from roaming over a wide area when it is desirable to keep the pets close together. In the preferred embodiment, the clamping mechanism includes a conversion fastener 82, such as a swivel snap, which is attached to the second ring 80 between the middle section 74 and the second end section 76. The conversion swivel snap 82 is permanently mounted to the second ring 80 and can be snapped onto the first ring 78 to hold the two sides of the lead 70 together. Alternately, the conversion swivel snap 82 could be permanently mounted to the first ring 78 and could be snapped onto the second ring 80.

To convert the two-pet leash 50 into the two separate single-pet leashes 90 and 92 shown in FIGS. 2A and 2B, respectively, the second end section 76 is first detached from the middle section 74 by disconnecting swivel snap 84 from second ring 80. Next, the handle 52 is detached from the pulley 60 by disconnecting the swivel snap 56 from the pulley swivel member 62. Third, the handle 52 is attached to the second end section 76 by connecting swivel snap 56 to swivel snap 84, thereby forming the first separate single-pet leash 90, which is shown in FIG. 2A.

To form the second separate single-pet leash 92, which is shown in FIG. 2B, the conversion swivel snap 82 is simply connected to the first ring 78. The middle section 74 then serves as a handle for the resulting single-pet leash 92. The pulley 60 remains on the middle section 74 and, because of the presence of the rings 78 and 80, cannot be removed from the middle section and accidentally lost. Of course, if a two-pet leash is again desired, the above steps are reversed to reconstruct the two-pet leash 50 of the invention.

Another advantage the present invention enjoys over previously designed multiple pet leashes, especially the leash disclosed in the Crowe patent, is that when the two-pet leash 50 of the present invention is converted into two single-pet leashes 90, 92, the two resulting leashes are substantially the same length. Also, every one of the components of the two-pet leash 50 are used in the conversion to two separate leashes, thereby maximizing the lengths of both leashes 90, 92. There is no leftover leash material, as there is when the Crowe device is converted into two equal-length leashes. Nor do two unequal-length leashes result, which is the case with the Crowe device when all of the leash material of Crowe is used to form two separate leashes.

Certain modifications and improvements will occur to those skilled in the art upon a reading of the foregoing description. It should be understood that all such modifications and improvements have been deleted herein for the sake of conciseness and readability, but are properly within the scope of the following claims.

I claim:

1. A two-pet leash, comprising:
   (a) a handle;
   (b) a pulley attached to said handle; and
   (c) an elongated, flexible pet lead including:
      i) a first end section having a first pet collar connector for attachment to a first pet;
      ii) a second end section having a second pet collar connector for attachment to a second pet;
      iii) a middle section between said first and second end sections, said middle section threaded through said pulley and movable back and forth through said pulley;

iv) a first stop interconnected between said first end section and said middle section; and v) a second stop interconnected between said second end section and said middle section;

vi) wherein said first and second stops prevent said first and second end sections, respectively, from being pulled through said pulley.

2. The two-pet leash of claim 1, wherein said first and second stops each comprise a knot in said pet lead.

3. The two-pet leash of claim 1, further including clamping means for connecting said first and second stops together so as to substantially prevent said middle section from moving back and forth through said pulley.

4. The two-pet leash of claim 3, wherein said clamping means includes a ring attached to one of said stops and a swivel snap attached to the other of said stops.

5. The two-pet leash of claim 1, wherein said handle is detachably connected to said pulley.

6. A two-pet leash, comprising:

(a) a handle;

(b) a pulley detachably attached to said handle; and (c) an elongated, flexible pet lead including:

i) a first end section having a first pet collar connector for attachment to a first pet;

ii) a second end section having a second pet collar connector for attachment to a second pet; and iii) a middle section between said first and second end sections, said middle section threaded through said pulley and movable back and forth through said pulley;

iv) wherein said second end section is detachably connected to said middle section.

7. The two-pet leash of claim 6, wherein said handle may be connected to said second end section to be used together as a first separate leash, and wherein said middle section and said first end section are adaptable to be used together as a second separate leash.

8. A two-pet leash, comprising:

(a) a handle;

(b) a pulley detachably connected to said handle; and (c) an elongated, flexible pet lead including:

i) a first end section having a first pet collar connector that is attachable to a first pet, ii) a middle section attached to said first end section, said middle section threaded through said pulley and movable back and forth through said pulley, and iii) a second end section having a second pet collar connector that is attachable to a second pet, said second end section detachably connected to said middle section.

9. The two-pet leash of claim 8, wherein said pulley is swivelly connected to such handle.

10. The two-pet leash of claim 8, wherein said pet lead includes a first connector ring between said first end section and said middle section.

11. The two-pet leash of claim 10, wherein said middle section includes a second connector ring between second end section and said middle section, and wherein said second end section is detachably connected to said second connector ring.

12. The two-pet leash of claim 9, wherein said pulley includes a swivel attachment member, and wherein said handle includes a swivel snap for detachable connection to said swivel attachment member on said pulley.

13. The two-pet leash of claim 11, further comprising a conversion fastener attached to said second connector ring, whereby said two-pet leash is convertible into a first single-pet leash by detaching said second end section from said middle section, detaching said handle from said pulley, and then attaching said handle to said second end section, and whereby, said two-pet leash is convertible into a second single-pet leash by connecting said conversion fastener to said first connector ring.

14. A two-pet leash, comprising:

(a) a handle;

(b) a swiveling pulley connected to said handle; and (c) an elongated, flexible pet lead including:

i) a first end section having a collar connector for attachment to a first pet, ii) a second end section having a collar connector for attachment to a second pet, iii) a middle section between said first and second end sections, said middle section threaded through said pulley and movable back and forth through said pulley, iv) first limiting means interconnected between said first end section and said middle section for preventing said first end section from passing through said pulley, and v) second limiting means interconnected between said second end section and said middle section for preventing said second end section from passing through said pulley.

15. The two-pet leash of claim 14, further including clamping means for connecting said first and second limiting structures together so as to substantially prevent said middle section from moving back and forth through said pulley.

* * * * *